Jan. 3, 1933.    L. R. KERNS    1,893,087
LUBRICATOR VALVE
Original Filed Sept. 25, 1930

INVENTOR
Leonard R. Kerns
BY
ATTORNEYS

Patented Jan. 3, 1933

1,893,087

UNITED STATES PATENT OFFICE

LEONARD R. KERNS, OF BATTLE CREEK, MICHIGAN, ASSIGNOR TO LUBRICATION DEVICES, INC., OF BATTLE CREEK, MICHIGAN, A CORPORATION OF MICHIGAN

LUBRICATOR VALVE

Application filed September 25, 1930, Serial No. 484,332. Renewed May 26, 1932.

The present invention pertains to a novel lubricating device, particularly the measuring valve thereof, designed for use in centralized lubricating systems, wherein a plurality of points may be lubricated in a single operation, as shown in my related co-pending applications, Serial No. 341,957 and Serial No. 341,960, filed February 23, 1929.

The valve constituting the present invention has two distinct fluid chambers, one of which is a valve chamber and the other a measuring chamber with a piston therein. The piston is adapted to discharge the valve and is usually operated for this function by a source of pressure distinct from the pressure of the lubricant which the valve is designed to dispense. It is possible, however, that a single pressure system be used both for loading and discharging the valve, but in either case the fluids entering the valve for these functions are prevented by the piston from communicating with each other within the valve, inasmuch as they are effective at opposite sides of the piston.

The valve is so constructed as to assume its loading position by pressure on the lubricant from an external source and to be moved to discharge position by relief of this pressure and the application of pressure upon the piston in the direction which will empty the measuring chamber of its contents previously admitted in the loading position of the valve. The object of the invention consists in constructing a valve which definitely responds to these pressures in order to operate in the manner described.

The invention is fully disclosed by way of example in the following description and in the accompanying drawing in which—

Reference to these views will now be had by use of like characters which are employed to designate corresponding parts throughout.

Figure 1:
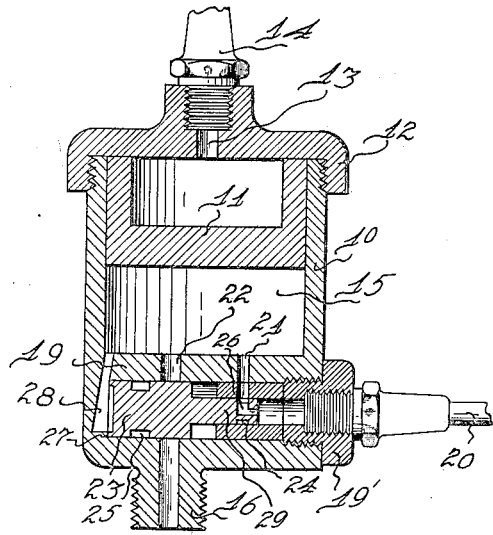
Figure 1 is a vertical section of the valve in loaded position.

The valve includes a body 10 having a piston 11 slidably mounted in the main chamber thereof. The upper end of the body is closed by a cap 12 in which is formed a pressure opening 13, so called because it admits and relieves the pressure fluid controlling the operation of the piston 11. This fluid is conveyed towards and away from the piston by means of a line 14 extending from any suitable pressure source, for example, such as that disclosed in the aforementioned co-pending applications. The space beneath the piston 11 when the latter is in the raised position shown in Fig. 1 may be identified as the fluid or measuring chamber 15.

The lower end of the body 10 is formed as a screw threaded nipple 16 inserted in or connected to a bearing or other member to be lubricated, in a manner already well known in the art. It will be understood that a valve of this character is applied to each point to be lubricated, and all such valves may have their respective pressure lines 14 connected to a common or main pressure line.

Above the nipple 16 the body 10 is formed with a valve chamber 18 separated from the measuring chamber by a wall or partition 19. One end of the valve chamber is joined by fittings 19' and the line 20 to a source adapted to supply lubricant under pressure, for example, as shown in the above mentioned co-pending applications. The lines 20 leading to the several valves may consist of branches from a common or main lubricant line.

The partition 19 has a loading opening 21 connecting the measuring chamber 15 to the valve chamber 18 and controllable with respect to its communication with the line 20 by the means presently to be described. The partition also has a discharge opening 22 connecting the chambers 15 and 18 and controlled with respect to its communication with the nipple 16 by the same means. This means consists of a slide valve 23 in the valve chamber adapted in one position to close the port 22 and open the port 21 and in another position to open the port 22 and close the port 21 as illustrated in Figs. 1 and 2 respectively.

The valve 23 is preferably a cylindrical member having grooves 24 and 25 near its ends. The minimum distance between the grooves is preferably at least as great as the maximum spacing between the ports 21 and 22, so that only one groove at a time may register with its respective port. The forward end of the valve 23, i. e., the end which takes the pressure of the branch 20, is formed with an angular duct 26 communicating with the groove 24. The ports are so dimensioned that when the rear end of the valve engages the rear wall 27 of the valve chamber 18, the groove 24 registers with the port 21 as in Fig. 1; and when the forward end of the valve engages the inner nipple 19', the groove 25 registers with the port 22 as in Fig. 2. Finally a duct 28 is formed in the partition 19 and extends to the rear wall 27 of the valve chamber to connect the piston chamber with the valve chamber at the rear end of the latter.

The forward end of the valve is reduced as at 29 and has a sliding fit in a bushing 30 inserted in the valve chamber to reduce the bore thereof in the vicinity of the loading opening 21. The bushing has a port 32 registering with the port 21 as a continuation thereof and thus enables the aforementioned communication between the groove 24 and the port 21.

Figure 2:
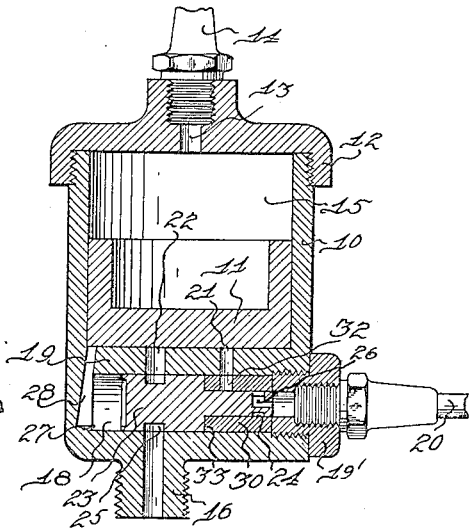
Fig. 2 is a similar section of the valve in discharged position.

In the operation of the device, assuming that the parts are in the position shown in Fig. 2, the pressure is relieved in the line 14 and lubricant under pressure is forced through the line 20 in the direction towards the valve chamber 18. Due to the pressure of the lubricant, the valve 23 is moved against the rear wall 27 of the valve chamber 18, and the lubricant passes through duct 26, groove 24, ports 32 and 21 into the chamber as shown in Fig. 1. The piston 11 is raised, and the lubricant contained above it, such as that used in the previous discharging operation, is expelled through the line 14. When the chamber 15 has been filled and the piston raised to its upper limit, the pressures in the lines 14 and 20 are reversed, i. e., the pressure in the line 20 is relieved and the pressure in the line 14 is raised to the point where it will discharge lubricant through the nipple 16 at the desired pressure.

The pressure thus created in the chamber 15 is communicated through the duct 28 to the rear and larger end of the valve 23, the outlet end of the duct being so shaped as to cover substantially the entire rear end, or at least an area larger than the forward end. Because of the different areas exposed to pressure at the ends of the valve, there is a greater pressure at the rear end, as a result of which the valve is moved to the position shown in Fig. 2, wherein the groove 25 connects the discharge port 22 to the nipple 16 while the groove 24 is removed entirely from the loading opening 21 and obstructed by the bushing 30. A shoulder 33 at the reduced end defines this position by abutting against the bushing 30. In this connection it should be noted that the aforementioned spacing of the grooves 24 and 25 with relation to the ports 21 and 22 prevents either port from opening until the other port is fully closed, in either direction of operation, so that both ports are at no time simultaneously open. In this manner the possibility of an open path of communication from the line 20 through the loading passages, chamber 15 and discharge passages to the outlet nipple 16 is entirely avoided. The valve 23 is thus restored to the position shown in Fig. 2, and another loading operation may then be performed in the manner already described.

Figure 3:
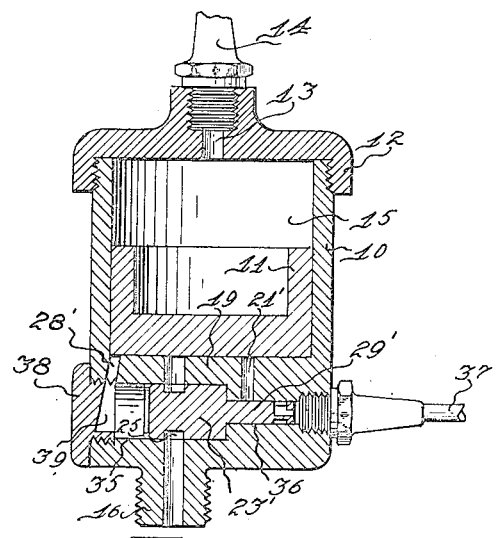
Fig. 3 is a similar section of a modified form of valve in discharged position.

In the modification shown in Fig. 3, the forward end of the valve chamber is reduced without the use of a separate bushing. The larger portion of the chamber is indicated by the numeral 35, while the forward and smaller portion 36 thereof is drilled from the corresponding side of the valve body. The lubricant line 37 may therefore be connected directly into the smaller bore without the use of fittings. The larger portion 35 of the valve chamber is obviously drilled from a diametrically opposite point on the valve body, and this point is closed by a screw plug 38 formed at its inner end with a slot 39 registering with the duct 28' in the partition 19, whereby the pressure exerted through the duct is effective over substantially the entire rear end of the valve 23'. The valve is constructed substantially in the manner described in connection with Figs. 1 and 2, having a reduced forward end 29' slidably fitting in the smaller bore 36 of the valve chamber. The loading port 21' is equivalent to the communicating ports 21 and 32 of Figs. 1 and 2, i. e., connecting the piston chamber to the valve chamber.

Although specific embodiments of the invention have been illustrated and described, it will be apparent that various alterations in the details of construction may be made without departing from the scope of the invention as indicated by the appended claims.

What I claim is:—

1. A measuring valve comprising a body, a piston reciprocable therein, said body having a loading opening and a discharge opening at one side of the piston, means for communicating pressure to the other side of the piston, a pressure operated slide valve adapted to obstruct said loading opening and open said discharge opening by pressure on said piston through said means and to obstruct said discharge opening and open said loading opening by pressure in said loading opening in the loading direction, intake means adapted to be connected to said loading opening by said valve, said valve having one end exposed to said intake means and the other end exposed to pressure in said body beneath said piston, the former end being of smaller cross sectional area than the latter end.

2. A measuring valve comprising a body, a piston reciprocable therein, said body having a loading opening and a discharge opening at one side of the piston, means for communicating pressure to the other side of the piston, a pressure operated slide valve adapted to obstruct said loading opening and open said discharge opening by pressure on said piston through said means and to obstruct said discharge opening and open said loading opening by pressure in said loading opening in the loading direction, intake means adapted to be connected to said loading opening by said valve, said valve having one end exposed to said intake means and the other end exposed to pressure in said body beneath said piston, the former end being of smaller cross sectional area than the latter end, said valve being dimensioned to obstruct either of said openings completely before permitting flow through the other opening.

3. A measuring valve comprising a body, a piston reciprocable therein, said body having a loading opening and a discharge opening at one side of the piston, means for communicating pressure to the other side of the piston, a pressure operated slide valve having ports adapted to register separately with said loading and discharge openings, intake means adapted to be connected to said loading opening by said valve, said valve having one end exposed to said intake means and the other end exposed to pressure in said body beneath said piston, the former end being of smaller cross sectional area than the latter end.

4. A measuring valve comprising a body, a piston reciprocable therein, said body having a loading opening and a discharge opening at one side of the piston, means for communicating pressure to the other side of the piston, a pressure operated slide valve having ports adapted to register separately with said loading and discharge openings, intake means adapted to be connected to said loading opening by said valve, said valve having one end exposed to said intake means and the other end exposed to pressure in said body beneath said piston, the former end being of smaller cross sectional area than the latter end, the minimum distance between said ports being greater than the maximum distance between said openings.

5. A measuring valve comprising a body, a partition therein defining a valve chamber and a fluid chamber, a piston reciprocable in said fluid chamber, said partition having a loading opening and a discharge opening connecting said chambers, means for communicating pressure to said piston towards said partition, a slide valve adapted to selectively open said loading and discharge openings, intake means to said chamber at one end of said valve and adapted to be connected to said loading opening by said valve, said end of the valve being of smaller cross sectional area than the other end thereof, said partition having a duct exposing the larger end of the valve to the pressure in said fluid chamber.

6. A measuring valve comprising a body, a partition therein defining a valve chamber and a fluid chamber, a piston reciprocable in said fluid chamber, said partition having a loading opening and a discharge opening connecting said chambers, means for communicating pressure to said piston towards said partition, a slide valve having ports adapted to register separately with said loading and discharge openings, intake means to said chamber at one end of said valve and adapted to be connected to said loading opening by said valve, said end of the valve being of smaller cross sectional area than the other end thereof, said partition having a duct exposing the larger end of the valve to the pressure in said fluid chamber.

7. A measuring valve comprising a body, a partition therein defining a valve chamber and a fluid chamber, a piston reciprocable in said fluid chamber, said partition having a loading opening and a discharge opening connecting said chambers, means for communicating pressure to said piston towards said partition, a slide valve having ports adapted to register separately with said loading and discharge openings, intake means to said chamber at one end of said valve and adapted to be connected to said loading opening by said valve, said end of the valve being of smaller cross sectional area than the other end thereof, said partition having a duct exposing the larger end of the valve to the pressure in said fluid chamber, the minimum distance between said ports being greater than the maximum distance between said openings.

In testimony whereof I affix my signature.

LEONARD R. KERNS.